United States Patent
Li et al.

(10) Patent No.: US 11,974,233 B2
(45) Date of Patent: Apr. 30, 2024

(54) POWER DETERMINATION METHOD AND APPARATUS, TERMINAL AND STORAGE MEDIUM

(71) Applicant: ZTE CORPORATION, Guangdong (CN)

(72) Inventors: Weimin Li, Guangdong (CN); Junfeng Zhang, Guangdong (CN); Yuzhou Hu, Guangdong (CN); Li Tian, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 355 days.

(21) Appl. No.: 17/607,700

(22) PCT Filed: Apr. 13, 2020

(86) PCT No.: PCT/CN2020/084412
§ 371 (c)(1),
(2) Date: Oct. 29, 2021

(87) PCT Pub. No.: WO2020/220979
PCT Pub. Date: Nov. 5, 2020

(65) Prior Publication Data
US 2022/0217652 A1    Jul. 7, 2022

(30) Foreign Application Priority Data

Apr. 30, 2019    (CN) .......................... 201910363751.2

(51) Int. Cl.
*H04W 52/36*    (2009.01)
*H04W 52/14*    (2009.01)
(Continued)

(52) U.S. Cl.
CPC .......... *H04W 52/36* (2013.01); *H04W 52/146* (2013.01); *H04W 52/288* (2013.01); *H04W 52/50* (2013.01)

(58) Field of Classification Search
CPC . H04W 52/36; H04W 52/146; H04W 52/288; H04W 52/50
See application file for complete search history.

(56) References Cited

U.S. PATENT DOCUMENTS

2019/0281634 A1*    9/2019  Takahashi ............. H04W 74/08
2020/0252970 A1    8/2020  Jiang
(Continued)

FOREIGN PATENT DOCUMENTS

| CN | 108353331 A | 7/2018 |
| CN | 110536403 A | 12/2019 |

(Continued)

OTHER PUBLICATIONS

WIPO, International Search Report dated Jun. 30, 2020.
(Continued)

*Primary Examiner* — Dai Phuong
(74) *Attorney, Agent, or Firm* — Li & Cai Intellectual Property (USA) Office

(57) ABSTRACT

Disclosed are a power determination method, a power determination apparatus, a terminal and a storage medium. The power determination method includes: acquiring a power ramping amount according to a power ramping count value and a power ramping step, where the power ramping count value includes a power ramping count value of a first transmission mode and a power ramping count value of a second transmission mode; and determining a transmission power according to the power ramping amount.

17 Claims, 3 Drawing Sheets

(51) Int. Cl.
*H04W 52/28* (2009.01)
*H04W 52/50* (2009.01)

(56) References Cited

U.S. PATENT DOCUMENTS

| | | | |
|---|---|---|---|
| 2020/0252974 A1* | 8/2020 | Akkarakaran | H04W 52/36 |
| 2021/0120504 A1* | 4/2021 | Ohara | H04W 74/0833 |
| 2021/0297960 A1* | 9/2021 | He | H04W 52/367 |
| 2022/0124818 A1* | 4/2022 | Lee | H04W 74/0833 |

FOREIGN PATENT DOCUMENTS

| | | | |
|---|---|---|---|
| EP | 3091794 A1 | 11/2016 | |
| WO | WO 2018133437 A1 | 7/2018 | |

OTHER PUBLICATIONS

Nokia, Nokia Shanghai Bell. "On 2-step RACH Procedure," 3GPP TSG RAN WG1 #96bis, Xi'an, China, Apr. 12, 2019.

ZTE, Sanechips. "On 2-Step RACH Procedures," 3GPP TSG RAN WG1 Meeting #96bis, Xi'an, China, Apr. 12, 2019.

European Patent Office, EP20799562.2 First Office Action dated Sep. 21, 2023.

Nokia et al.,"On 2-step RACH Procedure", 3GPP TSG RAN WG1 #96bis, R1-1904716 issued on Apr. 12, 2019.

ZTE, et al., "On 2-Step RACH Procedures", 3GPP TSG RAN WG1 Meeting, R1-1903879 issued on Apr. 12, 2019.

"3rd Generation Partnership Project; Technical Specification Group Radio Access Network; Evolved Universal Terrestrial Radio Access (E-UTRA); Medium Access Control (MAC) protocol specification (Release 15)" issued on Apr. 11, 2019.

\* cited by examiner

POWER DETERMINATION METHOD AND APPARATUS, TERMINAL AND STORAGE MEDIUM

CROSS-REFERENCE TO RELATED APPLICATION

The present application claims priority from the Chinese patent application No. 201910363751.2 filed with the China Patent Office on Apr. 30, 2019, the entire contents of which are incorporated in the present application by reference.

TECHNICAL FIELD

The present application relates to the field of communications, and for example, relates to a power determination method, a power determination apparatus, a terminal and a storage medium.

BACKGROUND

In related art, for example, in a Long Term Evolution (LTE) communication system or a New Radio Access Technology (New RAT or NR) communication system, when a terminal or a User Equipment (UE) needs to receive downlink data, a cell search process is required to acquire downlink synchronization with the cell. Similarly, uplink synchronization with the cell is required when the UE needs to perform uplink transmission. After completing the uplink and downlink synchronization, the UE enters a Radio Resource Control (RRC) connection state, and establishes a wireless connection with a Base Station (BS), as so to perform transceiving of uplink and downlink data. The UE establishes connection with the cell through a random access process, and thus achieves uplink synchronization and acquires a unique network identifier. The base station in the LTE system is generally called an evolved Node B (eNB), and the base station in the NR system is generally called a next generation Node B (gNB) oriented to NR users.

The random access process includes contention-based random access and non-contention-based random access. The contention-based random access may include a four-step Random Access Channel (4-step RACH) and a two-step Random Access Channel (2-step RACH). In the 2-step RACH, a preamble of a first step and a payload of a third step of the 4-step RACH may be transmitted via a messageA (msgA).

The UE may select to adopt either the 2-step RACH or the 4-step RACH for random access. In addition, in the 2-step RACH, when the msgA fails to be sent from the UE or fails to be successfully received by the base station, the UE may fall back, and perform random access according to the 4-step RACH process. When the UE selects the 2-step RACH or the 4-step RACH for multiple random access attempts, it is necessary to improve the transmission performance and the transmission efficiency.

SUMMARY

An embodiment of the present application provides a power determination method, including:
acquiring a power ramping amount according to a power ramping count value and a power ramping step, where the power ramping count value includes a power ramping count value of a first transmission mode and a power ramping count value of a second transmission mode; and
determining a transmission power according to the power ramping amount.

An embodiment of the present application further provides a power determination apparatus, including:
a power ramping amount acquiring module configured to acquire a power ramping amount according to a power ramping count value and a power ramping step, where the power ramping count value includes a power ramping count value of a first transmission mode and a power ramping count value of a second transmission mode; and
a power determination module configured to determine a transmission power according to the power ramping amount.

An embodiment of the present application further provides a terminal, including: a processor and a storage device; where
the storage device is configured to store instructions; and
the processor is configured to read the instructions to implement the method applied to the terminal according to the embodiment of the present application.

An embodiment of the present application further provides a storage medium having a computer program stored thereon which, when executed by a processor, cause the method according to the embodiment of the present application to be implemented.

According to the embodiments of the present application, the power ramping amount is determined according to the power ramping amount of the first transmission mode and the power ramping amount of the second transmission mode, and then the transmission power is determined according to the power ramping amount, thereby ensuring the transmission power during switching of the UE between such two different transmission modes, improving the transmission performance as well as the access efficiency.

DETAILED DESCRIPTION

Embodiments of the present application will be described in detail below with reference to the accompanying drawings.

Figure 1:
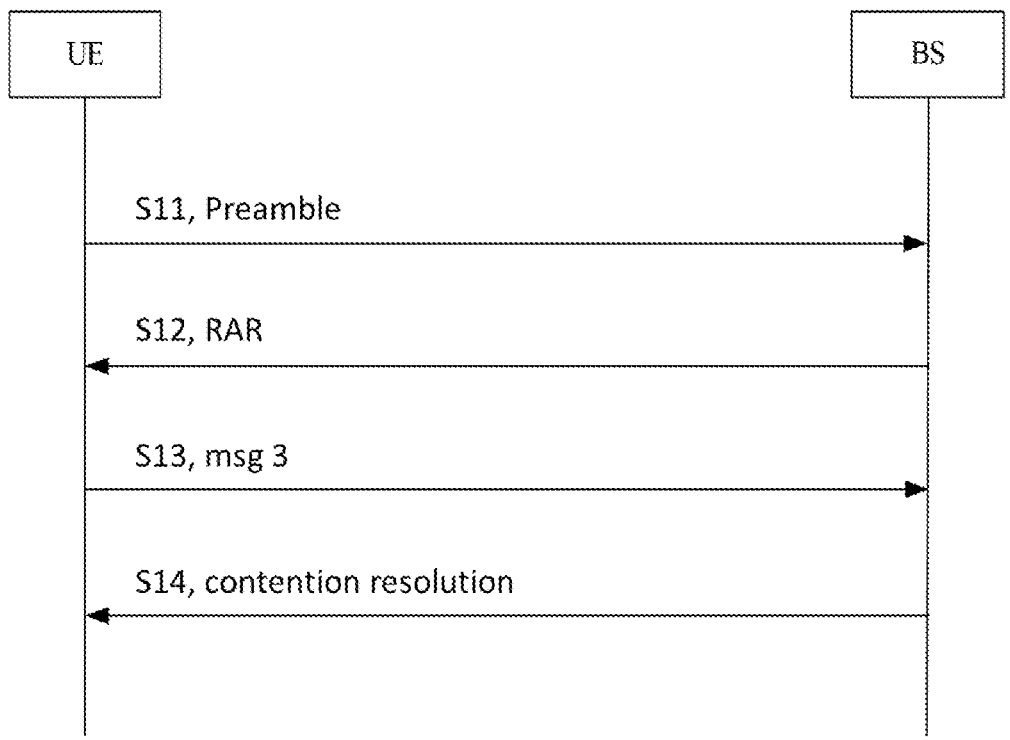
FIG. 1 is a schematic flowchart of a 4-step RACH.

As shown in FIG. 1, the contention-based random access process may include the following four steps S11 to S14.

At step S11, a UE sends a preamble. The UE acquires a preamble sequence and sends the preamble sequence to a base station via a Physical Random Access Channel (PRACH). In this way, the base station is informed of a random access request so that the base station can estimate a transmission delay between it and the UE and thus calibrate the uplink timing. The preamble in this step may also be referred to as message 1 (msg1).

At step S12, the base station sends a Random Access Response (RAR). The RAR carries timing adjustment information, uplink scheduling or grant information, a temporary network identifier, and the like. After sending the preamble, the UE will receive the RAR within an RAR time window. If the RAR fed back from the base station is not received within the time window, the random access process is deemed as failed. The RAR in this step may also be referred to as message 2 (msg2).

At step S13, the UE sends message 3 (msg3). The UE sends msg3 on a Physical Uplink Shared Channel (PUSCH) according to information in the received RAR. A piece of important information, i.e., UE unique identifier information, is contained in msg3, which is to be used for conflict resolution in step S14.

At step S14, the base station sends a contention resolution message, which may also be referred to as message 4 (msg4). In this step, the base station carries the UE unique identifier information in msg4 to specify the UE that wins in the conflict resolution. Other UEs that have not won in the conflict resolution will initiate random access again.

For non-contention-based random access, the UE sends a dedicated preamble thereof and thus no conflict is present. Also, since the UE already has a unique network identifier in the access cell, the base station no longer needs to assign one for the UE. Therefore, the non-contention-based random access process does not include steps S13 and S14.

The above random access process including four steps may also be referred to as 4-step RACH for short. In order to simplify the access procedure and reduce the access delay, the 4-step RACH may be reduced to 2-step RACH.

Figure 2:
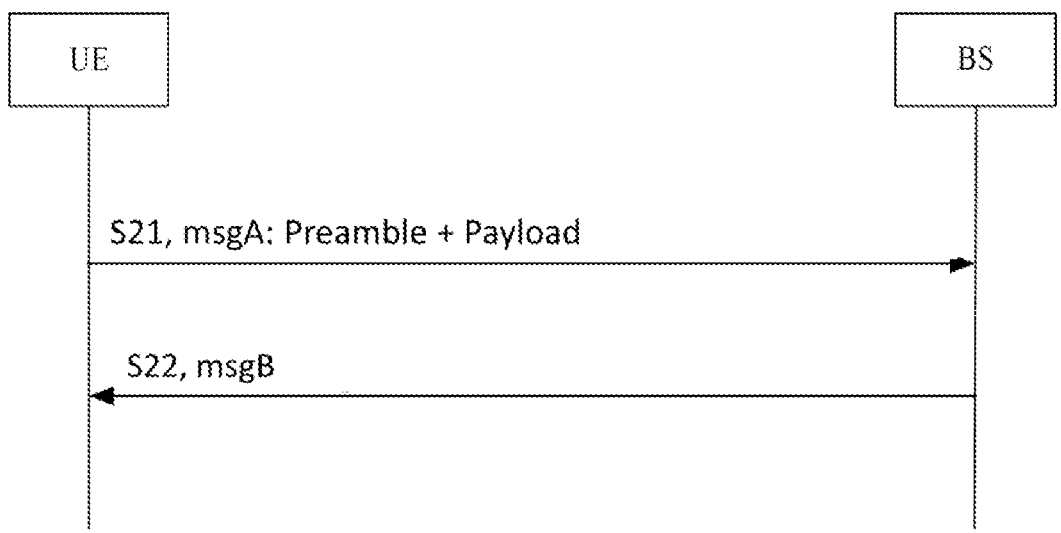
FIG. 2 is a schematic flowchart of a 2-step RACH.

As shown in FIG. 2, the 2-step RACH process includes two steps, i.e., steps S21 to S22.

At step S21, the UE sends a message A (msgA). This message includes two parts, i.e., a preamble and a payload. The payload may be sent through a Physical Uplink Shared Channel (PUSCH) to carry uplink information sent from the UE. The payload may include contents similar to msg3 in step S13 of the 4-step RACH, traffic data, and the like.

At step S22, the base station sends a message B (msgB). This message is used for implementing functions similar to those of steps S12 and S14 in the 4-step RACH, such as timing adjustment, conflict resolution, and the like.

The UE may select to adopt either the 2-step RACH or the 4-step RACH for random access. The UE may need to make multiple random access attempts in one random access process. For each random access attempt, the UE may also select to adopt either the 2-step RACH or the 4-step RACH.

In addition, in the 2-step RACH, when the msgA fails to be sent from the UE or fails to be successfully received by the base station, the UE may fall back, and perform random access according to the 4-step RACH process. For example, when the preamble and the payload are both failed to be transmitted, the UE may perform random access again according to the four steps as described above.

When the UE selects the 2-step RACH or the 4-step RACH for multiple random access attempts, the random access mode will be switched, and thus, it is necessary to design a reasonable random access process to improve the transmission performance and the transmission efficiency.

Figure 3:
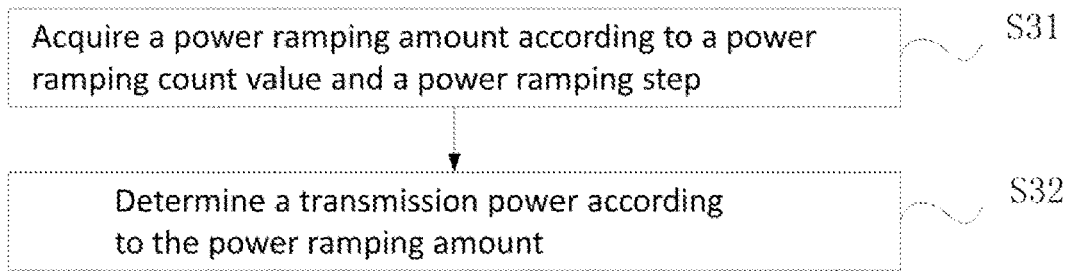
FIG. 3 is a schematic flowchart of a power determination method according to an embodiment of the present application.

FIG. 3 is a schematic flowchart of a power determination method according to an embodiment of the present application. As shown in FIG. 3, the method may include the following steps S31 to S32.

At step S31, acquire a power ramping amount according to a power ramping count value and a power ramping step, where the power ramping count value includes a power ramping count value of a first transmission mode and a power ramping count value of a second transmission mode.

At step S32, determine a transmission power according to the power ramping amount.

In an implementation, the power ramping count value may be a count value obtained by counting the number of power rampings by a counter, and includes a preamble power ramping count value, a PUSCH power ramping count value, and the like.

In the embodiment of the present application, the power determination method may be applied to a terminal, including a UE.

In the embodiment of the present application, various transmission modes may be provided, such as 4-step RACH, 2-step RACH, contention data transmission, grant-free data transmission, and the like. The first transmission mode and the second transmission mode are two different transmission modes. The first transmission mode is firstly adopted for the access attempt, and if the first transmission mode fails, the second transmission mode is then adopted.

In an implementation, the first transmission mode includes 2-step RACH, and the second transmission mode includes 4-step RACH.

In an implementation, the first transmission mode includes 4-step RACH, and the second transmission mode includes 2-step RACH.

In an implementation, the first transmission mode includes contention data transmission or grant-free data transmission, and the second transmission mode includes 2-step RACH or 4-step RACH.

In an implementation, the first transmission mode includes 2-step RACH or 4-step RACH, and the second transmission mode includes contention data transmission or grant-free data transmission.

In an implementation, the first transmission mode includes 2-step RACH, or contention data transmission, or grant-free data transmission, and the second transmission mode includes 4-step RACH.

In an implementation, the first transmission mode includes 4-step RACH, and the second transmission mode includes 2-step RACH, or contention data transmission, or grant-free data transmission.

In the power determination method provided in the embodiment of the present application, the power ramping amount is determined according to the power ramping count value of the first transmission mode and the power ramping count value of the second transmission mode, and then the transmission power is determined according to the power ramping amount, which may be used to determine the transmission power when multiple transmissions are performed in different transmission modes (also referred to as transmission manners or transmission types), so as to achieve the effect of improving the transmission performance and the transmission efficiency.

In an implementation, the acquiring the power ramping amount according to the power ramping count value and the power ramping step includes:

acquiring a first power ramping amount according to the power ramping count value of the first transmission mode; acquiring a second power ramping amount according to the power ramping count value of the second transmission mode; and acquiring the power ramping amount according to the first power ramping amount and the second power ramping amount.

In the embodiment of the present application, the first power ramping amount and the second power ramping amount may be calculated without any particular order. The first power ramping amount may be calculated before the second power ramping amount, or the second power ramping amount may be calculated before the first power ramping amount.

In an example, the first power ramping amount may be calculated according to a power ramping count value of the first transmission mode and a power ramping step of the first transmission mode. The second power ramping amount may be calculated according to a power ramping count value of the second transmission mode and a power ramping step of the second transmission mode.

In an implementation, the power ramping step includes a first power ramping step and a second power ramping step, where the first power ramping step is a power ramping step of the first transmission mode, and the second power ramping step is a power ramping step of the second transmission mode.

The acquiring the first power ramping amount according to the power ramping count value of the first transmission mode includes: acquiring the first power ramping amount as a product of a value obtained by subtracting 1 from the power ramping count value of the first transmission mode and the first power ramping step.

The acquiring the second power ramping amount according to the power ramping count value of the second transmission mode includes: acquiring the second power ramping amount as a product of the power ramping count value of the second transmission mode and the second power ramping step.

In the embodiment of the present application, the first transmission mode is adopted for the first access attempt, in which the power may be not ramped up. Therefore, the first power ramping amount may be a product of a value obtained by subtracting 1 from the power ramping count value of the first transmission mode and the first power ramping step. The second transmission mode is adopted for the access attempt after the first access attempt. Therefore, it does not need to subtract 1 from the power ramping count value of the second transmission mode when calculating the second power ramping amount. However, this is related to initialized values of the power ramping count value of the first transmission mode and the power ramping count value of the second transmission mode, and a count value change condition or situation. It is not excluded that the power ramping count value of the second transmission mode also needs to be subtracted by 1 when calculating the second power ramping amount.

In an implementation, the acquiring the first power ramping amount according to the power ramping count value of the first transmission mode includes: acquiring the first power ramping amount as a product of a value obtained by subtracting 1 from the power ramping count value of the first transmission mode and the power ramping step.

The acquiring the second power ramping amount according to the power ramping count value of the second transmission mode includes: acquiring the second power ramping amount as a product of the power ramping count value of the second transmission mode and the power ramping step.

In an implementation, power ramping steps of the first and second transmission modes may be the same.

In an implementation, the acquiring the power ramping amount according to the first power ramping amount and the second power ramping amount includes: acquiring the power ramping amount as a sum of the first power ramping amount and the second power ramping amount.

In an implementation, power ramping steps of the first and second transmission modes may be the same. When calculating the power ramping amount, the power ramping count value of the first transmission mode and the power ramping count value of the second transmission mode may be added and subtracted by 1, and then multiplied by the power ramping step.

It is also not excluded here that the power ramping count value of the second transmission mode needs to be subtracted by 1 when calculating the second power ramping amount. Alternatively, it is not excluded that the power ramping count value of the first transmission mode and the power ramping count value of the second transmission mode are added and subtracted by 2.

In an implementation, the power ramping count value of the first transmission mode is a value of a first counter, and the power ramping count value of the second transmission mode is a value of a second counter.

In an implementation, a first counter may be used to acquire a power ramping count value of the first transmission mode, and a second counter may be used to acquire a power ramping count value of the second transmission mode. When the UE performs one access attempt in the first transmission mode with a power ramping, the count value of the first counter is increased by 1. When the UE performs one access attempt in the second transmission mode with a power ramping, the count value of the second counter is increased by 1.

In an implementation, the power ramping count value is a value of a third counter.

The power ramping count value including the power ramping count value of the first transmission mode and the power ramping count value of the second transmission mode includes: the value of the third counter is a sum of the power ramping count value of the first transmission mode and the power ramping count value of the second transmission mode.

When the power ramping is to be performed in the first transmission mode, the value of the third counter is increased by 1, and when the power ramping is to be performed in the second transmission mode, the value of the third counter is increased by 1.

In an implementation, a total number of power rampings may be acquired by one third counter so that the value of the third counter is increased by 1 as long as one access attempt occurs and the power ramping is to be performed, regardless of the mode adopted by the UE for the access attempt.

In an implementation, the acquiring the power ramping amount according to the power ramping count value and the power ramping step includes: acquiring the power ramping amount as a product of a value obtained by subtracting 1 from the power ramping count value and the power ramping step.

In an implementation, power ramping steps of the first and second transmission modes may be the same, and the power ramping amount may be a product of a value obtained by subtracting 1 from a total power ramping count value and the power ramping step.

When calculating the power ramping amount, different transmission modes may adopt different power ramping count values and different power ramping steps, which are exemplified as below.

Example I: the power ramping count value of the first transmission mode is a preamble power ramping count value of the first transmission mode, and the power ramping count value of the second transmission mode is a preamble power ramping count value of the second transmission mode; and the first power ramping step is a preamble power ramping step of the first transmission mode, and the second power ramping step is a preamble power ramping step of the second transmission mode.

In this example, the first transmission mode may include 4-step RACH, and the second transmission mode may include 2-step RACH.

In this example, the first transmission mode may include 2-step RACH, and the second transmission mode may include 4-step RACH.

In this example, the power ramping amount may be used for determining a target received power for a random access preamble in a certain random access attempt, or for determining a PRACH transmission power in a certain random access attempt.

In this example, the power ramping amount may be used for determining a PUSCH transmission power in a certain random access attempt.

Example II: the power ramping count value of the first transmission mode is a PUSCH power ramping count value of the first transmission mode, and the power ramping count value of the second transmission mode is a preamble power ramping count value of the second transmission mode; and the first power ramping step is a PUSCH power ramping step of the first transmission mode, and the second power ramping step is a preamble power ramping step of the second transmission mode.

In this example, the first transmission mode includes contention data transmission, or grant-free data transmission, and the second transmission mode includes 2-step RACH or 4-step RACH. The power ramping amount is used for determining a PRACH transmission power in a certain access attempt.

In this example, the first transmission mode includes 2-step RACH, or contention data transmission, or grant-free data transmission, and the second transmission mode includes 4-step RACH. The power ramping amount is used for determining a PUSCH transmission power in a certain access attempt.

Example III: the power ramping count value of the first transmission mode is a preamble power ramping count value of the first transmission mode, and the power ramping count value of the second transmission mode is a PUSCH power ramping count value of the second transmission mode; and the first power ramping step is a preamble power ramping step of the first transmission mode, and the second power ramping step is a PUSCH power ramping step of the second transmission mode.

In this example, in one case, the first transmission mode includes 2-step RACH or 4-step RACH, and the second transmission mode includes contention data transmission or grant-free data transmission. The power ramping amount is used for determining a PRACH transmission power in a certain access attempt.

In this example, in another case, the first transmission mode includes 4-step RACH, and the second transmission mode includes 2-step RACH, contention data transmission, or grant-free data transmission. The power ramping amount is used for determining a PUSCH transmission power in a certain access attempt.

Example IV: the power ramping count value of the first transmission mode is a preamble power ramping count value of the first transmission mode, and the power ramping count value of the second transmission mode is a preamble power ramping count value of the second transmission mode; and the power ramping step is a preamble power ramping step or a PUSCH power ramping step.

In this example, the preamble power ramping count value of the first transmission mode and the preamble power ramping count value of the second transmission mode may be acquired by two counters, respectively, or may be acquired by one counter, i.e., a third counter. The count value acquired by the third counter is a sum of the preamble power ramping count value of the first transmission mode and the preamble power ramping count value of the second transmission mode.

In this example, in one case, the power ramping step is a preamble power ramping step. The first transmission mode includes 2-step RACH, and the second transmission mode includes 4-step RACH. Alternatively, the first transmission mode includes 4-step RACH, and the second transmission mode includes 2-step RACH.

In this example, in another case, the power ramping step is a PUSCH power ramping step. The first transmission mode includes 2-step RACH, and the second transmission mode includes 4-step RACH. Alternatively, the first transmission mode includes 4-step RACH, and the second transmission mode includes 2-step RACH.

Example V: the power ramping count value of the first transmission mode is a PUSCH power ramping count value of the first transmission mode, and the power ramping count value of the second transmission mode is a preamble power ramping count value of the second transmission mode; and the power ramping step is a preamble power ramping step or a PUSCH power ramping step.

In this example, the PUSCH power ramping count value of the first transmission mode and the preamble power ramping count value of the second transmission mode may be acquired by two counters, respectively, or may be acquired by one counter, i.e., a third counter. The count value acquired by the third counter is a sum of the PUSCH power ramping count value of the first transmission mode and the preamble power ramping count value of the second transmission mode.

In this example, in one case, the power ramping step is a preamble power ramping step. The first transmission mode includes contention data transmission or grant-free data transmission, and the second transmission mode includes 2-step RACH or 4-step RACH. Alternatively, the first transmission mode includes 2-step RACH, contention data transmission, or grant-free data transmission, and the second transmission mode includes 4-step RACH.

In this example, in another case, the power ramping step is a PUSCH power ramping step. The first transmission mode includes 2-step RACH, or contention data transmission, or grant-free data transmission, and the second transmission mode includes 4-step RACH.

Example VI: the power ramping count value of the first transmission mode is a preamble power ramping count value of the first transmission mode, and the power ramping count value of the second transmission mode is a PUSCH power ramping count value of the second transmission mode; and the power ramping step is a preamble power ramping step or a PUSCH power ramping step.

In this example, the preamble power ramping count value of the first transmission mode and the PUSCH power ramping count value of the second transmission mode may be acquired by two counters, respectively, or may be acquired by one counter, i.e., a third counter. The count value acquired by the third counter is a sum of the preamble power ramping count value of the first transmission mode and the PUSCH power ramping count value of the second transmission mode.

In this example, in one case, the power ramping step is a preamble power ramping step. The first transmission mode includes 2-step RACH or 4-step RACH, and the second transmission mode includes contention data transmission or grant-free data transmission. Alternatively, the first transmission mode includes 4-step RACH, and the second transmission mode includes 2-step RACH, contention data transmission, or grant-free data transmission.

In this example, in another case, the power ramping step is a PUSCH power ramping step. The first transmission mode includes 4-step RACH, and the second transmission mode includes 2-step RACH, contention data transmission, or grant-free data transmission.

In an implementation, the third counter includes: a preamble power ramping counter, or a PUSCH power ramping counter, or an access attempt power ramping counter.

In the embodiment of the present application, the third counter may be configured to acquire the power ramping count value of the first transmission mode and the power ramping count value of the second transmission mode.

In an implementation, the first counter, the second counter, or the third counter may be a variable for recording or counting a count value.

In an implementation, the determining the transmission power according to the power ramping amount includes:

determining a transmission power of a physical random access channel according to the power ramping amount; or, determining the transmission power of the PUSCH according to the power ramping amount.

Figure 4:
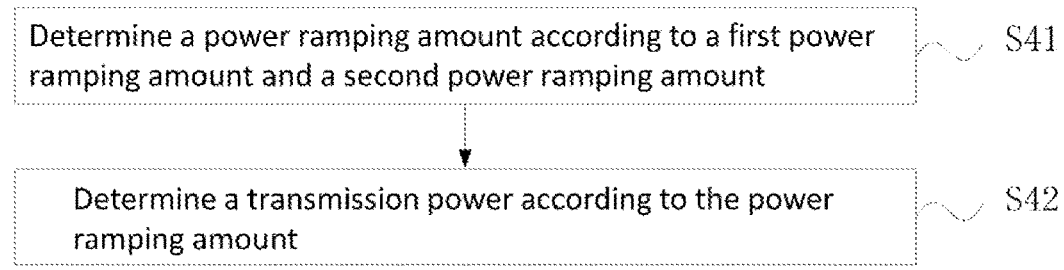
FIG. 4 is a schematic flowchart of a power determination method according to an embodiment of the present application.

In an example of the present application, the power determination method includes the steps S41 to S42 shown in FIG. 4.

At step S41, determine a power ramping amount according to a first power ramping amount and a second power ramping amount.

At step S42, determine a transmission power according to the power ramping amount.

The first power ramping amount is a power ramping amount of the first transmission mode; and the second power ramping amount is a power ramping amount of the second transmission mode.

In an implementation, the first transmission mode includes 2-step RACH, and the second transmission mode includes 4-step RACH.

In an implementation, the first transmission mode includes 4-step RACH, and the second transmission mode includes 2-step RACH.

In an implementation, the first transmission mode includes contention data transmission, or grant-free data transmission, such as PUSCH only or Payload only. The second transmission mode includes 2-step RACH or 4-step RACH.

In an implementation, the first transmission mode includes 2-step RACH or 4-step RACH, and the second transmission mode includes contention data transmission, or grant-free data transmission.

In an implementation, the first transmission mode includes 2-step RACH, or contention data transmission, or grant-free data transmission, and the second transmission mode includes 4-step RACH.

In an implementation, the first transmission mode includes 4-step RACH, and the second transmission mode includes 2-step RACH, or contention data transmission, or grant-free data transmission.

The contention data transmission includes contention-based data transmission. For example, when a UE transmits a payload through a PUSCH, transmission resources such as the PUSCH and the Demodulation Reference Signal (DMRS) are randomly selected.

The grant-free data transmission includes data transmission based on a grant-free mode. For example, when a UE transmits a payload through a PUSCH, transmission resources such as the PUSCH and the DMRS are preconfigured, semi-statically configured, or randomly selected.

In an implementation, the first power ramping amount is: (a first count value−1)×a first step; the second power ramping amount is: a second count value×a second step.

In an implementation, the determining the power ramping amount according to the first power ramping amount and the second power ramping amount includes: determining the power ramping amount as a sum of the first power ramping amount and the second power ramping amount, i.e., (the first count value−1)×the first step+the second count value×the second step.

In an implementation, two counters are used to acquire the first count value and the second count value, respectively.

In an implementation, the first step and the second step may be the same. In an implementation, the first count value and the second count value are acquired by one counter, or a sum of the first count value and the second count value is acquired by one counter.

In an implementation, the number of consecutive transmissions in the first transmission mode is X, where X is an integer greater than or equal to 1.

In an example of the present application, multiple access attempts may be made in one access transmission. The multiple access attempts include the first transmission mode and the second transmission mode. The first access attempt may adopt the first transmission mode.

For example, the multiple random access attempts for one random access may include 2-step RACH and 4-step RACH, and the first random access attempt adopts 2-step RACH.

For another example, the first to $a'$ random access attempts adopt 2-step RACH, the $(a+1)^{th}$ to $b^{th}$ random access attempts adopt 4-step RACH, the $(b+1)^{th}$ to $c^{th}$ random access attempts adopt 2-step RACH, the $(c+1)^{th}$ to $d^{th}$ random access attempts adopt 4-step RACH, so on and so forth, where a, b, c and d are positive integers and d>c>b>a.

For another example, the first e random access attempts adopt 2-step RACH, and the subsequent random access attempts adopt 4-step RACH. That is, the maximum number of random access attempts adopting 2-step RACH is e.

For another example, when the UE performs random access, if a preamble transmission for one random access attempt fails, and if the number of preamble transmissions is less than or equal to the maximum number of preamble transmissions, the following schemes may be adopted for random access attempts according to different situations.

If the UE determines that 2-step RACH can be adopted and the number of consecutive transmissions of 2-step RACH is less than or equal to X, the UE adopts the 2-step RACH to perform a random access attempt again, where X is an integer greater than or equal to 1; otherwise, if the number of consecutive transmissions of 2-step RACH is greater than X, the UE adopts the 4-step RACH to perform a random access attempt again; otherwise, if the UE determines that 4-step RACH is required, the UE adopts the 4-step RACH to perform a random access attempt again; otherwise, if the number of preamble transmissions is greater than the maximum number of preamble transmissions, the random access may be considered to be failed; It can be seen that the number of consecutive transmissions of 2-step RACH is controlled to be X, and the maximum number of transmissions of 2-step RACH is not directly limited.

In this example, the number of transmissions or attempts of different random access schemes may be recorded or counted by one or more transmission counters. For example, one counter is used as a transmission counter to record the number of transmissions of 2-step RACH and the number of transmissions of 4-step RACH, or two counters, i.e., a first transmission counter and a second transmission counter, are used, where the first transmission counter is configured to record the number of transmissions of 2-step RACH, and the second transmission counter is configured to record the number of transmissions of 4-step RACH.

In an example of the present application, multiple attempts may be made in one access transmission. The multiple access attempts include the first transmission mode and the second transmission mode. The first access attempt may adopt the first transmission mode.

In an example, the first counter is used as a power ramping counter of the first transmission mode to record the number of power rampings in the first transmission mode, and the second counter is used as a power ramping counter of the second transmission mode to record the number of power rampings in the second transmission mode.

When the UE access process starts or is initialized, the following parameters are initialized by:

initializing the first counter to 1, and representing the count value thereof as f; initializing the second counter to 1, and representing the count value thereof as g; and representing the power ramping step by s, assuming here that the first transmission mode and the second transmission mode use the same power ramping step.

When the UE (re-) makes an access attempt in the first transmission mode and will perform a power ramping, the first counter will be incremented by 1. When the UE (re-) makes an access attempt in the second transmission mode and will perform a power ramping, the second counter will be incremented by 1. The first access attempt may be made without any power ramping.

Then, for the first transmission, or when only the first transmission mode is included in the multiple access attempts, the first power ramping amount is: $(f-1)\times s$, the second power ramping amount is: $(g-1)\times s=(1-1)\times s=0$, then the power ramping amount may be a sum of the first power ramping amount and the second power ramping amount, i.e., $(f-1)\times s+(g-1)\times s=(f-1)\times s+0=(f-1)\times s$.

When both the first transmission mode and the second transmission mode are included in the multiple access attempts, the first power ramping amount is: $(f-1)\times s$, the second power ramping amount is: $g\times s$, then the power ramping amount may be a sum of the first power ramping amount and the second power ramping amount, i.e., $(f-1)\times s+g\times s$.

It can be seen that in the above example, it needs to distinguish whether it is the first transmission or whether the first transmission mode and the second transmission mode are included in the multiple access attempts, or process differently therefor, which is relatively complicated.

Therefore, an example in which the first counter is still used as a power ramping counter of the first transmission mode to record the number of power rampings in the first transmission mode, and the second counter is used as a power ramping counter of the second transmission mode to record the number of power rampings in the second transmission mode may be considered. When the access process starts or is initialized, the following parameters are initialized by:

initializing the first counter to 1, and representing the count value thereof as f; initializing the second counter to 0, and representing the count value thereof as g; and representing the power ramping step by s.

When a certain access attempt adopts the second transmission mode during the access process, the initialization is carried out by:

initializing the second counter to 1, and representing the count value thereof as g. Then, for each access attempt and transmission, the first power ramping amount is: $(f-1)\times s$, the second power ramping amount is: $g\times s$, then the power ramping amount may be a sum of the first power ramping amount and the second power ramping amount, i.e., $(f-1)\times s+g\times s$.

It can be seen that, in this example, it does not need to distinguish between different cases, which is relatively simple.

Implementation 1

In an implementation of the present application, the first transmission mode includes 2-step RACH, and the second transmission mode includes 4-step RACH. In this implementation, the multiple random access attempts for one random access may include 2-step RACH and 4-step RACH, and the first random access attempt adopts 2-step RACH.

In this implementation, the first power ramping amount is a preamble power ramping amount of 2-step RACH in the multiple random access attempts, and the second power ramping amount is a preamble power ramping amount of 4-step RACH in the multiple random access attempts.

The first power ramping amount is: (the first count value$-1$)$\times$the first step; the second power ramping amount is: the second count value$\times$the second step.

The first count value is a preamble power ramping count value of 2-step RACH, and the second count value is a preamble power ramping count value of 4-step RACH. The first random access attempt adopts 2-step RACH, and may be made without any power ramping. Therefore, the first power ramping amount is: (the first count value$-1$)$\times$the first step. Since the random access attempt of 4-step RACH occurs after the random access attempt of 2-step RACH, the second count value may be not subtracted by 1.

In this implementation, a power ramping amount is determined according to the first power ramping amount and the second power ramping amount, and used for determining a target received power for a random access preamble in a certain random access attempt, and then a PRACH transmission power in a certain random access attempt is determined according to the target received power.

According to the power ramping amount, the UE may set a target received power of a random access preamble in a certain random access as:

$$P\_target = \text{preambleReceivedTargetPower} + \text{DeltaPreamble} + \text{PowerRamping},$$

where preambleReceivedTargetPower is an initial target received power of the preamble, DeltaPreamble is power offset related to a preamble format, and PowerRamping is the power ramping amount.

According to the set target received power of the random access preamble, the UE may determine the PRACH transmission power as:

$$P = \min(P\max, P\_target + PL),$$

where Pmax is the maximum transmission power of the UE, and PL represents a path loss.

The methods for calculating the preamble target received power and the PRACH transmission power in other implementations of the present application may refer to the description in this implementation.

The power ramping amount may be a sum of the first power ramping amount and the second power ramping amount, i.e., (the first count value−1)×the first step+the second count value×the second step.

In this implementation, the first count value may be a value of a first counter, and the first counter is a preamble power ramping counter of 2-step RACH, and configured to record the number of preamble power rampings of 2-step RACH; and the second count value may be a value of a second counter, and the second counter is a preamble power ramping counter of 4-step RACH, and configured to record the number of preamble power rampings of 4-step RACH.

The first step may be a preamble power ramping step of 2-step RACH, and the second step may be a preamble power ramping step of 4-step RACH.

Then, the power ramping amount=(the first counter−1)×the first step+the second counter×the second step.

PowerRamping=
(PreamblePowerRampingCounter_2step−1)×
PreamblePowerRampingStep_2step+
(PreamblePowerRampingCounter_4step)×
PreamblePowerRampingStep_4step, where PowerRamping is the power ramping amount, PreamblePowerRampingCounter_2step is a preamble power ramping count value of the 2-step RACH mode, i.e., the first count value, PreamblePowerRampingStep_2step is a preamble power ramping step of the 2-step RACH mode, i.e., the first power ramping step, PreamblePowerRampingCounter_4step is a preamble power ramping count value of the 4-step RACH mode, i.e., the second count value, and PreamblePowerRampingStep_4step is a preamble power ramping step of the 4-step RACH mode, i.e., the second power ramping step.

In this implementation, the first step and the second step may be the same and both are the preamble power ramping step. That is, the 2-step RACH and the 4-step RACH use the same preamble power ramping step. The first step and the second step may be two parameters, and take the same value; or, the first step and the second step may be the same parameter, i.e., the preamble power ramping step parameter.

Then, the power ramping amount=(the first counter−1)× the preamble power ramping step+the second counter×the preamble power ramping step=(the first counter+the second counter−1)×the preamble power ramping step. The formula is as follows:

PowerRamping=
(PreamblePowerRampingCounter_2step−1)×
PreamblePowerRampingStep+
(PreamblePowerRampingCounter_4step)×
PreamblePowerRampingStep=
(PreamblePowerRampingCounter_2step+
PreamblePowerRampingCounter_4step−1)×
PreamblePowerRampingStep, where PreambePowerRampingStep is the preamble power ramping step.

In this implementation, the first count value and the second count value may be acquired by one counter, or a sum of the first count value and the second count value may be acquired by one counter. This one counter may be a preamble power ramping counter. Further, the first step and the second step may be the same and both are the preamble power ramping step. Then, the power ramping amount=(the preamble power ramping counter−1)×the preamble power ramping step. The formula is as follows:

PowerRamping=(PreamblePowerRampingCounter−
1)×PreamblePowerRamping Step, where PreamblePowerRampingCounter is a count value of the preamble power ramping counter.

Implementation 2

In an implementation of the present application, the first transmission mode includes 4-step RACH, and the second transmission mode includes 2-step RACH.

In this implementation, the multiple random access attempts for one random access may include 4-step RACH and 2-step RACH, and the first random access attempt adopts 4-step RACH.

In this implementation, the first power ramping amount is a preamble power ramping amount of 4-step RACH in the multiple random access attempts, and the second power ramping amount is a preamble power ramping amount of 2-step RACH in the multiple random access attempts.

The first power ramping amount is: (the first count value−1)×the first step; the second power ramping amount is: the second count value×the second step, where the first count value is a preamble power ramping count value of 4-step RACH, and the second count value is a preamble power ramping count value of 2-step RACH. The first random access attempt adopts 4-step RACH, and may be made without any power ramping. Therefore, the first power ramping amount is: (the first count value−1)×the first step. Since the random access attempt of 2-step RACH occurs after the random access attempt of 4-step RACH, the second count value may be not subtracted by 1.

In this implementation, a power ramping amount is determined according to the first power ramping amount and the second power ramping amount, and used for determining a target received power for a random access preamble in a certain random access attempt, and then a PRACH transmission power in a certain random access attempt is determined according to the target received power.

The power ramping amount may be a sum of the first power ramping amount and the second power ramping amount, i.e., (the first count value−1)×the first step+the second count value×the second step.

In this implementation, the first count value may be a value of a first counter, and the first counter is a preamble power ramping counter of 4-step RACH, and configured to record the number of preamble power rampings of 4-step RACH; and the second count value may be a value of a second counter, and the second counter is a preamble power ramping counter of 2-step RACH, and configured to record the number of preamble power rampings of 2-step RACH.

The first step may be a preamble power ramping step of 4-step RACH, and the second step may be a preamble power ramping step of 2-step RACH.

Then, the power ramping amount=(the first counter−1)×the first step+the second counter×the second step.

PowerRamping=
(PreamblePowerRampingCounter_4step−1)×
PreamblePowerRampingStep_4step+
(PreamblePowerRampingCounter_2step)×
PreamblePowerRampingStep_2step.

In this implementation, the first step and the second step may be the same and both are the preamble power ramping step. That is, the 4-step RACH and the 2-step RACH use the same preamble power ramping step. The first step and the second step may be two parameters, and take the same value; or, the first step and the second step may be the same parameter, i.e., the preamble power ramping step parameter.

Then, the power ramping amount=(the first counter−1)×the preamble power ramping step+the second counter×the preamble power ramping step=(the first counter+the second counter−1)×the preamble power ramping step.

PowerRamping=
(PreamblePowerRampingCounter_4step−1)×
PreamblePowerRampingStep+
(PreamblePowerRampingCounter_2step)×
PreamblePowerRampingStep=
(PreamblePowerRampingCounter_4step+
PreamblePowerRampingCounter_2step−1)×
PreamblePowerRampingStep, where Preamble_Step is the preamble power ramping step.

In this implementation, the first count value and the second count value may be acquired by one counter, or a sum of the first count value and the second count value may be acquired by one counter. This one counter may be a preamble power ramping counter. Further, the first step and the second step may be the same and both are the preamble power ramping step. Then, the power ramping amount=(the preamble power ramping counter−1)×the preamble power ramping step.

PowerRamping=(PreamblePowerRampingCounter−1)×PreamblePowerRampingStep.

Implementation 3

In an implementation of the present application, the first transmission mode includes contention data transmission or grant-free data transmission, and the second transmission mode includes 2-step RACH or 4-step RACH.

The contention data transmission includes contention-based data transmission. For example, when a UE transmits a payload through a PUSCH, transmission resources such as the PUSCH and the DMRS are randomly selected. The grant-free data transmission includes data transmission based on a grant-free mode. For example, when a UE transmits a payload through a PUSCH, transmission resources such as the PUSCH and the DMRS are preconfigured, semi-statically configured, or randomly selected. An example of contention data transmission or grant-free data transmission may be PUSCH only transmission or payload only transmission.

In this implementation, the multiple attempts for one access transmission include the first transmission mode and the second transmission mode as described above, and the first access attempt adopts the first transmission mode, i.e., the contention data transmission, or the grant-free data transmission.

In this implementation, the first power ramping amount may be a power ramping amount obtained from the first transmission mode in the multiple access attempts, and the second power ramping amount may be a preamble power ramping amount of the second transmission mode in the multiple access attempts.

The first power ramping amount is: (the first count value−1)×the first step; the second power ramping amount is: the second count value×the second step.

The first count value is a PUSCH power ramping count value of the first transmission mode, and the second count value is a preamble power ramping count value of the second transmission mode. The first access attempt adopts the first transmission mode and may be made without any power ramping. Therefore, the first power ramping amount is: (the first count value−1)×the first step. Since the access attempt of the second transmission mode occurs after the access attempt of the first transmission mode, the second count value may be not subtracted by 1.

Then, a power ramping amount is determined according to the first power ramping amount and the second power ramping amount, and used for determining a target received power for a random access preamble (in a certain random access attempt), and then a PRACH transmission power (in a certain random access attempt) is determined according to the target received power.

The power ramping amount may be a sum of the first power ramping amount and the second power ramping amount, i.e., (the first count value−1)×the first step+the second count value×the second step.

In this implementation, the first count value may be a value of a first counter, and the first counter is a PUSCH power ramping counter of the first transmission mode and configured to record the number of PUSCH power rampings in the first transmission mode; and the second count value may be a value of a second counter, and the second counter is a preamble power ramping counter of the second transmission mode and configured to record the number of preamble power rampings in the second transmission mode.

The first step may be a PUSCH power ramping step of the first transmission mode, and the second step may be a preamble power ramping step of the second transmission mode.

Then, the power ramping amount=(the first counter−1)× the PUSCH power ramping step+the second counter×the preamble power ramping step.

PowerRamping=(PUSCHPowerRampingCounter−1)×
PUSCHPowerRampingStep+(PreamblePower-
RampingCounter)×PreamblePowerRampingStep,
where PUSCHPowerRampingCounter is the PUSCH power ramping count value, i.e., a value of the first counter; PUSCHPowerRampingStep is the PUSCH power ramping step; and PreamblePowerRampingCounter is the preamble power ramping count value, i.e., a value of the second counter.

In this implementation, the first step and the second step may be the same and both are the preamble power ramping step. That is, the first transmission mode and the second transmission mode use the same power ramping step. The first step and the second step may be two parameters, and take the same value; or, the first step and the second step may be the same parameter, i.e., the preamble power ramping step parameter.

Then, the power ramping amount=(the first counter−1)× the preamble power ramping step+the second counter×the preamble power ramping step=(the first counter+the second counter−1)×the preamble power ramping step.

PowerRamping=(PUSCHPowerRampingCounter−1)×
PreamblePowerRampingStep+(PreamblePower-
RampingCounter)×PreamblePowerRamping-
Step=(PUSCHPowerRampingCounter+
PreamblePowerRampingCounter−1)×
PreamblePowerRampingStep.

In this implementation, the first count value and the second count value may be acquired by one counter, or a sum of the first count value and the second count value may be acquired by one counter. This one counter may be a preamble power ramping counter. Further, the first step and the second step may be the same and both are the preamble power ramping step. Then, the power ramping amount=(the preamble power ramping counter−1)×the preamble power ramping step.

> PowerRamping=(PreamblePowerRampingCounter−1)×PreamblePowerRampingStep.

Implementation 4

In an implementation of the present application, the first transmission mode includes 2-step RACH or 4-step RACH, and the second transmission mode includes contention data transmission or grant-free data transmission.

In this implementation, the multiple attempts for one access transmission include the first transmission mode and the second transmission mode as described above, and the first access attempt adopts the first transmission mode, i.e., 2-step RACH or 4-step RACH.

In this implementation, the first power ramping amount may be a preamble power ramping amount of the first transmission mode in the multiple access attempts, and the second power ramping amount may be a power ramping amount obtained from the second transmission mode in the multiple access attempts.

The first power ramping amount is: (the first count value−1)×the first step; the second power ramping amount is: the second count value×the second step.

The first count value is a preamble power ramping count value of the first transmission mode, and the second count value is a PUSCH power ramping count value of the second transmission mode. The first access attempt adopts the first transmission mode and may be made without any power ramping. Therefore, the first power ramping amount is: (the first count value−1)×the first step. Since the access attempt of the second transmission mode occurs after the access attempt of the first transmission mode, the second count value may be not subtracted by 1.

Then, a power ramping amount is determined according to the first power ramping amount and the second power ramping amount, and used for determining a target received power for a random access preamble (in a certain random access attempt), and then a PRACH transmission power (in a certain random access attempt) is determined according to the target received power.

The power ramping amount may be a sum of the first power ramping amount and the second power ramping amount, i.e., (the first count value−1)×the first step+the second count value×the second step.

In this implementation, the first count value may be a value of a first counter, and the first counter is a preamble power ramping counter of the first transmission mode and configured to record the number of preamble power rampings in the first transmission mode; and the second count value may be a value of a second counter, and the second counter is a PUSCH power ramping counter of the second transmission mode and configured to record the number of PUSCH power rampings in the second transmission mode.

The first step may be a preamble power ramping step of the first transmission mode, and the second step may be a PUSCH power ramping step of the second transmission mode.

> Then, the power ramping amount=(the first counter−1)×the preamble power ramping step+the second counter×the PUSCH power ramping step.
>
> PowerRamping=(PreamblePowerRampingCounter−1)×PreamblePowerRampingStep+(PUSCHPowerRampingCounter)×PUSCHPowerRampingStep.

In this implementation, the first step and the second step may be the same and both are the preamble power ramping step. That is, the first transmission mode and the second transmission mode use the same power ramping step. The first step and the second step may be two parameters, and take the same value; or, the first step and the second step may be the same parameter, i.e., the preamble power ramping step parameter.

> Then, the power ramping amount=(the first counter−1)×the preamble power ramping step+the second counter×the preamble power ramping step=(the first counter+the second counter−1)×the preamble power ramping step.
>
> PowerRamping=(PreamblePowerRampingCounter−1)×PreamblePowerRampingStep+(PUSCHPowerRampingCounter)×PreamblePowerRampingStep=(PreamblePowerRampingCounter+PUSCHPowerRampingCounter−1)×PreamblePowerRampingStep.

In this implementation, the first count value and the second count value may be acquired by one counter, or a sum of the first count value and the second count value may be acquired by one counter. This one counter may be a preamble power ramping counter. Further, the first step and the second step may be the same and both are the preamble power ramping step. Then, the power ramping amount=(the preamble power ramping counter−1)×the preamble power ramping step.

> PowerRamping=(PreamblePowerRampingCounter−1)×PreamblePowerRampingStep.

Implementation 5

In an implementation of the present application, the first transmission mode includes 2-step RACH, and the second transmission mode includes 4-step RACH.

In this implementation, the multiple random access attempts for one random access may include 2-step RACH and 4-step RACH, and the first random access attempt adopts 2-step RACH.

In this implementation, the first power ramping amount is: (the first count value−1)×the first step; the second power ramping amount is: the second count value×the second step.

The first count value is a preamble power ramping count value of 2-step RACH, and the second count value is a preamble power ramping count value of 4-step RACH. The first random access attempt adopts 2-step RACH, and may be made without any power ramping. Therefore, the first power ramping amount is: (the first count value−1)×the first step. Since the random access attempt of 4-step RACH occurs after the random access attempt of 2-step RACH, the second count value may be not subtracted by 1.

In this implementation, a power ramping amount is determined according to the first power ramping amount and the second power ramping amount, and used for determining a PUSCH transmission power (in a certain random access attempt).

The UE determines the PUSCH transmission power in a certain random access attempt according to the power ramping amount, including:

> $P=\min(P\max, Po+10\times\log 10(a\times M)+\text{alpha}\times PL+\text{Delta}+\text{PowerRamping})$, where Pmax is the maximum transmission power of the UE, M is the transmission resource bandwidth, a is a factor related to a subcarrier spacing, PL is a path loss, alpha is a path loss compensation factor, Delta is a power offset related to a transmission format or MCS, and PowerRamping is the power ramping amount.

Alternatively, $P=\min(P\text{max}, Po+10\times\log 10(a\times M)+\text{alpha}\times PL+\text{Delta}+h)$, where h is a power adjustment amount, the power ramping amount PowerRamping is included in the power adjustment amount h, and the power adjustment amount h may further include other power adjustment amounts.

The methods for calculating the PUSCH transmission power in other implementations of the present application may refer to the description in this implementation.

The power ramping amount may be a sum of the first power ramping amount and the second power ramping amount, i.e., (the first count value−1)×the first step+the second count value×the second step.

In this implementation, the first count value may be a value of a first counter, and the first counter is a preamble power ramping counter of 2-step RACH, and configured to record the number of preamble power rampings of 2-step RACH; and the second count value may be a value of a second counter, and the second counter is a preamble power ramping counter of 4-step RACH, and configured to record the number of preamble power rampings of 4-step RACH.

The first step may be a preamble power ramping step of 2-step RACH, and the second step may be a preamble power ramping step of 4-step RACH.

Then, the power ramping amount=(the first counter−1)×the first step+the second counter×the second step.

PowerRamping=
 (PreamblePowerRampingCounter_2step−1)×
 PreamblePowerRampingStep_2step+
 (PreamblePowerRampingCounter_4step)×
 PreamblePowerRampingStep_4step.

Here, it can be seen that the first power ramping amount is a preamble power ramping amount of 2-step RACH in the multiple random access attempts, and the second power ramping amount is a preamble power ramping amount of 4-step RACH in the multiple random access attempts.

In this implementation, the first step and the second step may be the same and both are the preamble power ramping step. That is, the 2-step RACH and the 4-step RACH use the same preamble power ramping step. The first step and the second step may be two parameters, and take the same value; or, the first step and the second step may be the same parameter, i.e., the preamble power ramping step parameter.

Then, the power ramping amount=(the first counter−1)×the preamble power ramping step+the second counter×the preamble power ramping step=(the first counter+the second counter−1)×the preamble power ramping step.

PowerRamping=
 (PreamblePowerRampingCounter_2step−1)×
 PreamblePowerRampingStep+
 (PreamblePowerRampingCounter_4step)×
 PreamblePowerRampingStep=
 (PreamblePowerRampingCounter_2step+
 PreamblePowerRampingCounter_4step−1)×
 PreamblePowerRampingStep.

Here, it can also be seen that the first power ramping amount is a preamble power ramping amount of 2-step RACH in the multiple random access attempts, and the second power ramping amount is a preamble power ramping amount of 4-step RACH in the multiple random access attempts.

In this implementation, the first step and the second step may be the same and both are the PUSCH power ramping step. The first step and the second step may be the same parameter, i.e., the PUSCH power ramping step parameter.

Then, the power ramping amount=(the first counter−1)× the PUSCH power ramping step+the second counter×the PUSCH power ramping step=(the first counter+the second counter−1)×the PUSCH power ramping step.

PowerRamping=
 (PreamblePowerRampingCounter_2step−1)×
 PUSCHPowerRampingStep+
 (PreamblePowerRampingCounter_4step)×
 PUSCHPowerRampingStep=
 (PreamblePowerRampingCounter_2step+
 PreamblePowerRampingCounter_4step−1)×
 PUSCHPowerRampingStep.

In this implementation, the first count value and the second count value may be acquired by one counter, or a sum of the first count value and the second count value may be acquired by one counter. This one counter may be a preamble power ramping counter.

Further, the first step and the second step may be the same and both are the preamble power ramping step. Then, the power ramping amount=(the preamble power ramping counter−1)×the preamble power ramping step.

PowerRamping=(PreamblePowerRampingCounter−
 1)×PreamblePowerRampingStep.

Alternatively, the first step and the second step may be the same, and both are the PUSCH power ramping step. Then, the power ramping amount=(the preamble power ramping counter−1)×the PUSCH power ramping step.

PowerRamping=(PreamblePowerRampingCounter−
 1)×PUSCHPowerRampingStep.

In this implementation, it is considered that power ramping needs to be performed on the PUSCH as long as the preamble transmission is unsuccessful, regardless of whether a PUSCH is transmitted, that is, regardless of 2-step RACH or 4-step RACH. In addition, when the power ramping is performed on the PUSCH, the same step as that of the preamble power ramping, that is, the preamble power ramping step, may be used. The PUSCH power ramping step may also be used to implement fast or larger power ramping on the PUSCH, or to compensate for the influence of being unable to perform closed-loop power adjustment, that is, when the base station does not provide a power adjustment command, for example, a transmission power control command, for the UE to perform appropriate power adjustment, the PUSCH power ramping step is used to perform fast or larger power ramping on the PUSCH, thereby compensating for the influence caused by lacking the power adjustment command provided by the base station.

Implementation 6

In an implementation of the present application, the first transmission mode includes 4-step RACH, and the second transmission mode includes 2-step RACH.

In this implementation, the multiple random access attempts for one random access may include 4-step RACH and 2-step RACH, and the first random access attempt adopts 4-step RACH.

In this implementation, the first power ramping amount is: (the first count value−1)×the first step; the second power ramping amount is: the second count value×the second step.

The first count value is a preamble power ramping count value of 4-step RACH, and the second count value is a preamble power ramping count value of 2-step RACH. The first random access attempt adopts 4-step RACH, and may be made without any power ramping. Therefore, the first power ramping amount is: (the first count value−1)×the first step. Since the random access attempt of 2-step RACH occurs after the random access attempt of 4-step RACH, the second count value may be not subtracted by 1.

In this implementation, a power ramping amount is determined according to the first power ramping amount and the second power ramping amount, and used for determining a PUSCH transmission power (in a certain random access attempt).

The power ramping amount may be a sum of the first power ramping amount and the second power ramping amount, i.e., (the first count value−1)×the first step+the second count value×the second step.

In this implementation, the first count value may be a value of a first counter, and the first counter is a preamble power ramping counter of 4-step RACH, and configured to record the number of preamble power rampings of 4-step RACH; and the second count value may be a value of a second counter, and the second counter is a preamble power ramping counter of 2-step RACH, and configured to record the number of preamble power rampings of 2-step RACH.

The first step may be a preamble power ramping step of 4-step RACH, and the second step may be a preamble power ramping step of 2-step RACH.

Then, the power ramping amount=(the first counter−1)×the first step+the second counter×the second step.

PowerRamping=
(PreamblePowerRampingCounter_4step−1)×
PreamblePowerRampingStep_4step+
(PreamblePowerRampingCounter_2step)×
PreamblePowerRampingStep_2step.

Here, it can be seen that the first power ramping amount is a preamble power ramping amount of 4-step RACH in the multiple random access attempts, and the second power ramping amount is a preamble power ramping amount of 2-step RACH in the multiple random access attempts.

In this implementation, the first step and the second step may be the same and both are the preamble power ramping step. That is, the 4-step RACH and the 2-step RACH use the same preamble power ramping step. The first step and the second step may be two parameters, and take the same value; or, the first step and the second step may be the same parameter, i.e., the preamble power ramping step parameter.

Then, the power ramping amount=(the first counter−1)×the preamble power ramping step+the second counter×the preamble power ramping step=(the first counter+the second counter−1)×the preamble power ramping step.

PowerRamping=
(PreamblePowerRampingCounter_4step−1)×
PreamblePowerRampingStep+
(PreamblePowerRampingCounter_2step)×
PreamblePowerRampingStep=
(PreamblePowerRampingCounter_4step+
PreamblePowerRampingCounter_2step−1)×
PreamblePowerRampingStep.

Here, it can also be seen that the first power ramping amount is a preamble power ramping amount of 4-step RACH in the multiple random access attempts, and the second power ramping amount is a preamble power ramping amount of 2-step RACH in the multiple random access attempts.

In this implementation the first step and the second step may be the same and both are the PUSCH power ramping step. The first step and the second step may be the same parameter, i.e., the PUSCH power ramping step parameter.

Then, the power ramping amount=(the first counter−1)×the PUSCH power ramping step+the second counter×the PUSCH power ramping step=(the first counter+the second counter−1)×the PUSCH power ramping step.

PowerRamping=
(PreamblePowerRampingCounter_4step−1)×
PUSCHPowerRampingStep+
(PreamblePowerRampingCounter_2step)×
PUSCHPowerRampingStep=
(PreamblePowerRampingCounter_4step+
PreamblePowerRampingCounter_2step−1)×
PUSCHPowerRampingStep.

In this implementation, the first count value and the second count value may be acquired by one counter, or a sum of the first count value and the second count value may be acquired by one counter. This one counter may be a preamble power ramping counter.

Further, the first step and the second step may be the same and both are the preamble power ramping step. Then, the power ramping amount=(the preamble power ramping counter−1)×the preamble power ramping step.

PowerRamping=(PreamblePowerRampingCounter−1)×PreamblePowerRampingStep.

Alternatively, the first step and the second step may be the same, and both are the PUSCH power ramping step. Then, the power ramping amount=(the preamble power ramping counter−1)×the PUSCH power ramping step.

PowerRamping=(PreamblePowerRampingCounter−1)×PUSCHPowerRampingStep.

Implementation 7

In an implementation of the present application, the first transmission mode includes 2-step RACH, contention data transmission, or grant-free data transmission, and the second transmission mode includes 4-step RACH.

In this implementation, the multiple attempts for one access transmission include the first transmission mode and the second transmission mode as described above, and the first access attempt adopts the first transmission mode.

In this implementation, the first power ramping amount is: (the first count value−1)×the first step; the second power ramping amount is: the second count value×the second step.

The first count value is a PUSCH power ramping count value of the first transmission mode, and the second count value is a preamble power ramping count value of the second transmission mode. The first access attempt adopts the first transmission mode and may be made without any power ramping. Therefore, the first power ramping amount is: (the first count value−1)×the first step. Since the access attempt of the second transmission mode occurs after the access attempt of the first transmission mode, the second count value may be not subtracted by 1.

In this implementation, a power ramping amount is determined according to the first power ramping amount and the second power ramping amount, and used for determining a PUSCH transmission power (in a certain access attempt).

The power ramping amount may be a sum of the first power ramping amount and the second power ramping amount, i.e., (the first count value−1)×the first step+the second count value×the second step.

In this implementation, the first count value may be a value of a first counter, and the first counter is a PUSCH power ramping counter of the first transmission mode and configured to record the number of PUSCH power rampings in the first transmission mode; and the second count value may be a value of a second counter, and the second counter is a preamble power ramping counter of the second transmission mode and configured to record the number of preamble power rampings in the second transmission mode.

The first step may be a PUSCH power ramping step of the first transmission mode, and the second step may be a preamble power ramping step of the second transmission mode.

Then, the power ramping amount=(the first counter−1)×the first step+the second counter×the second step.

PowerRamping=(PUSCHPowerRampingCounter−1)×PUSCHPowerRampingStep+(PreamblePowerRampingCounter)×PreamblePowerRampingStep.

Here, it can be seen that the first power ramping amount is a PUSCH power ramping amount of the first transmission mode in the multiple access attempts, and the second power ramping amount is a preamble power ramping amount of the second transmission mode in the multiple access attempts.

In this implementation, the first step and the second step may be the same and both are the preamble power ramping step. That is, the first transmission mode and the second transmission mode use the same power ramping step. The first step and the second step may be two parameters, and take the same value; or, the first step and the second step may be the same parameter, i.e., the preamble power ramping step parameter.

Then, the power ramping amount=(the first counter−1)×the preamble power ramping step+the second counter×the preamble power ramping step=(the first counter+the second counter−1)×the preamble power ramping step.

PowerRamping=(PUSCHPowerRampingCounter−1)×PreamblePowerRampingStep+(PreamblePowerRampingCounter)×PreamblePowerRampingStep=(PUSCHPowerRampingCounter+PreamblePowerRampingCounter−1)×PreamblePowerRampingStep.

In this implementation, the first step and the second step may be the same and both are the PUSCH power ramping step. The first step and the second step may be the same parameter, i.e., the PUSCH power ramping step parameter.

Then, the power ramping amount=(the first counter−1)×the PUSCH power ramping step+the second counter×the PUSCH power ramping step=(the first counter+the second counter−1)×the PUSCH power ramping step.

PowerRamping=(PUSCHPowerRampingCounter−1)×PUSCHPowerRampingStep+(PreamblePowerRampingCounter)×PUSCHPowerRampingStep=(PUSCHPowerRampingCounter+PreamblePowerRampingCounter−1)×PUSCHPowerRampingStep.

In this implementation, the first count value and the second count value may be acquired by one counter, or a sum of the first count value and the second count value may be acquired by one counter. This one counter may be a PUSCH power ramping counter.

Further, the first step and the second step may be the same and both are the preamble power ramping step. Then, the power ramping amount=(PUSCH power ramping counter−1)×preamble power ramping step.

PowerRamping=(PUSCHPowerRampingCounter−1)×PreamblePowerRampingStep.

Alternatively, the first step and the second step may be the same, and both are the PUSCH power ramping step. Then, the power ramping amount=(PUSCH power ramping counter−1)×PUSCH power ramping step.

PowerRamping=(PUSCHPowerRampingCounter−1)×PUSCHPowerRampingStep.

This one counter may also be an access attempt power ramping counter. Further, the first step and the second step both are the preamble power ramping step. Then, power ramping amount=(access attempt power ramping counter−1)×preamble power ramping step.

PowerRamping=(AttemptPowerRampingCounter−1)×PreamblePowerRampingStep.

Alternatively, the first step and the second step both are the PUSCH power ramping step. Then, power ramping amount=(access attempt power ramping counter−1)×PUSCH power ramping step.

PowerRamping=(AttemptPowerRampingCounter−1)×PUSCHPowerRampingStep.

Implementation 8

In an implementation of the present application, the first transmission mode includes 4-step RACH, and the second transmission mode includes 2-step RACH, contention data transmission, or grant-free data transmission.

In this implementation, the multiple attempts for one access transmission include the first transmission mode and the second transmission mode as described above, and the first access attempt adopts the first transmission mode.

In this implementation, the first power ramping amount is: (the first count value−1)×the first step; the second power ramping amount is: the second count value×the second step; where the first count value is a preamble power ramping count value of the first transmission mode, and the second count value is a PUSCH power ramping count value of the second transmission mode. The first access attempt adopts the first transmission mode and may be made without any power ramping. Therefore, the first power ramping amount is: (the first count value−1)×the first step. Since the access attempt of the second transmission mode occurs after the access attempt of the first transmission mode, the second count value may be not subtracted by 1.

In this implementation, a power ramping amount is determined according to the first power ramping amount and the second power ramping amount, and used for determining a PUSCH transmission power in a certain access attempt.

The power ramping amount may be a sum of the first power ramping amount and the second power ramping amount, i.e., (the first count value−1)×the first step+the second count value×the second step.

In this implementation, the first count value may be a value of a first counter, and the first counter is a preamble power ramping counter of the first transmission mode and configured to record the number of preamble power rampings in the first transmission mode; and the second count value may be a value of a second counter, and the second counter is a PUSCH power ramping counter of the second transmission mode and configured to record the number of PUSCH power rampings in the second transmission mode.

The first step may be a preamble power ramping step of the first transmission mode, and the second step may be a PUSCH power ramping step of the second transmission mode.

Then, the power ramping amount=(the first counter−1)×the first step+the second counter×the second step.

PowerRamping=(PreamblePowerRampingCounter−1)×PreamblePowerRampingStep+(PUSCHPowerRampingCounter)×PUSCHPowerRampingStep.

Here, it can be seen that the first power ramping amount is a preamble power ramping amount of the first transmission mode in the multiple access attempts, and the second power ramping amount is a PUSCH power ramping amount of the second transmission mode in the multiple access attempts.

In this implementation, the first step and the second step may be the same and both are the preamble power ramping step. That is, the first transmission mode and the second transmission mode use the same power ramping step. The first step and the second step may be two parameters, and take the same value; or, the first step and the second step may be the same parameter, i.e., the preamble power ramping step parameter.

Then, the power ramping amount=(the first counter−1)×the preamble power ramping step+the second counter×the preamble power ramping step=(the first counter+the second counter−1)×the preamble power ramping step.

PowerRamping=(PreamblePowerRampingCounter−1)×PreamblePowerRampingStep+(PUSCHPowerRampingCounter)×PreamblePowerRampingStep=(PreamblePowerRampingCounter+PUSCHPowerRampingCounter−1)×PreamblePowerRampingStep.

In this implementation, the first step and the second step may be the same and both are the PUSCH power ramping step. The first step and the second step may be the same parameter, i.e., the PUSCH power ramping step parameter.

Then, the power ramping amount=(the first counter−1)×the PUSCH power ramping step+the second counter×the PUSCH power ramping step=(the first counter+the second counter−1)×the PUSCH power ramping step.

PowerRamping=(PreamblePowerRampingCounter−1)×PUSCHPowerRampingStep+(PUSCHPowerRampingCounter)×PUSCHPowerRampingStep=(PreamblePowerRampingCounter+PUSCHPowerRampingCounter−1)×PUSCHPowerRampingStep.

In this implementation, the first count value and the second count value may be acquired by one counter, or a sum of the first count value and the second count value may be acquired by one counter. This one counter may be a PUSCH power ramping counter.

Further, the first step and the second step may be the same and both are the preamble power ramping step. Then, the power ramping amount=(PUSCH power ramping counter−1)×preamble power ramping step.

PowerRamping=(PUSCHPowerRampingCounter−1)×PreamblePowerRampingStep.

Alternatively, the first step and the second step may be the same, and both are the PUSCH power ramping step. Then, the power ramping amount=(PUSCH power ramping counter−1)×PUSCH power ramping step.

PowerRamping=(PUSCHPowerRampingCounter−1)×PUSCHPowerRampingStep.

This one counter may also be an access attempt power ramping counter. Further, the first step and the second step both are the preamble power ramping step. Then, power ramping amount=(access attempt power ramping counter−1)×preamble power ramping step.

PowerRamping=(AttemptPowerRampingCounter−1)×PreamblePowerRampingStep.

Alternatively, the first step and the second step both are the PUSCH power ramping step. Then, the power ramping amount=(access attempt power ramping counter−1)×PUSCH power ramping step.

PowerRamping=(AttemptPowerRampingCounter−1)×PUSCHPowerRampingStep.

Figure 5:
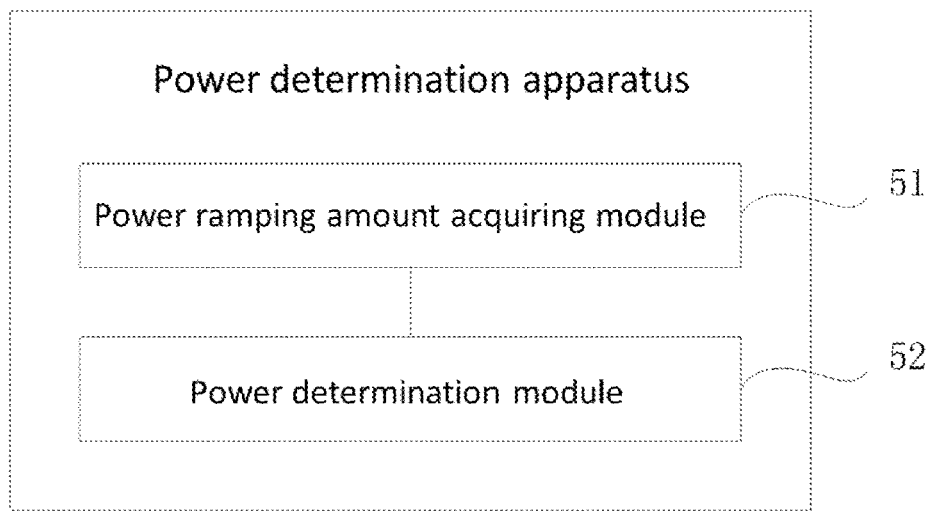
FIG. 5 is a schematic structural diagram of a power determination apparatus according to an embodiment of the present application.

FIG. 5 is a schematic structural diagram of a power determination apparatus according to an embodiment of the present application. As shown in FIG. 5, the apparatus may include:

a power ramping amount acquiring module 51 configured to acquire a power ramping amount according to a power ramping count value and a power ramping step, the power ramping count value including a power ramping count value of a first transmission mode and a power ramping count value of a second transmission mode; and a power determination module 52 configured to determine a transmission power according to the power ramping amount.

Figure 6:
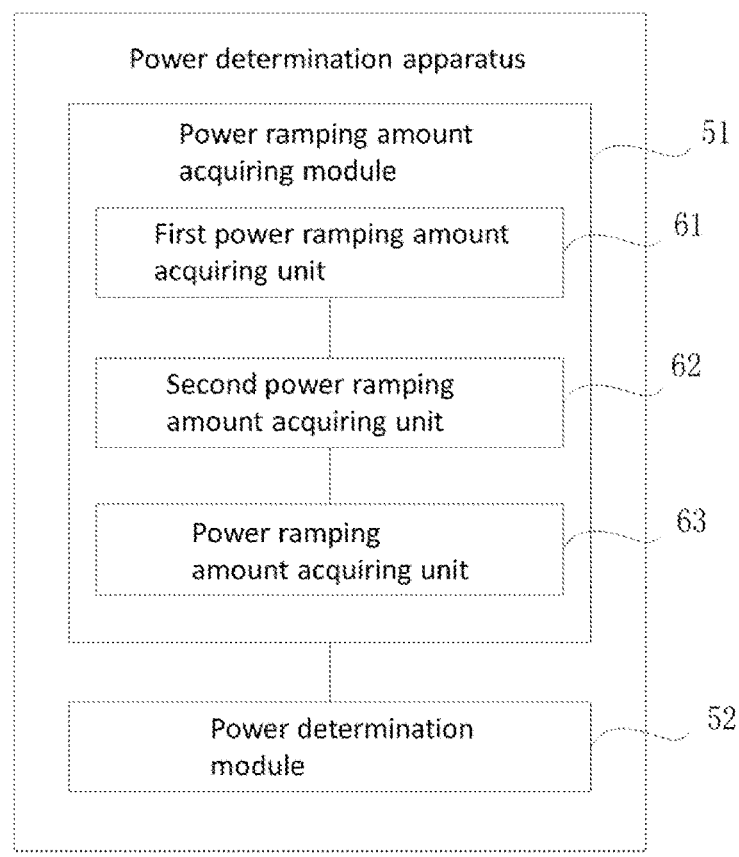
FIG. 6 is a schematic structural diagram of a power determination apparatus according to an embodiment of the present application.

In an implementation, as shown in FIG. 6, the power ramping amount acquiring module 51 includes:

a first power ramping amount acquiring unit 61 configured to acquire a first power ramping amount according to the power ramping count value of the first transmission mode; a second power ramping amount acquiring unit 62 configured to acquire a second power ramping amount according to the power ramping count value of the second transmission mode; and a power ramping amount acquiring unit 63 configured to acquire the power ramping amount according to the first power ramping amount and the second power ramping amount.

In an implementation, the power ramping step includes a first power ramping step and a second power ramping step. The first power ramping step is a power ramping step of the first transmission mode, and the second power ramping step is a power ramping step of the second transmission mode. The first power ramping amount acquiring unit 61 acquiring the first power ramping amount according to the power ramping count value of the first transmission mode includes: acquiring the first power ramping amount as a product of a value obtained by subtracting 1 from the power ramping count value of the first transmission mode and the first power ramping step; and the second power ramping amount acquiring unit 62 acquiring the second power ramping amount according to the power ramping count value of the second transmission mode includes: acquiring the second power ramping amount as a product of the power ramping count value of the second transmission mode and the second power ramping step.

In an implementation, the first power ramping amount acquiring unit 61 acquiring the first power ramping amount according to the power ramping count value of the first transmission mode includes: acquiring the first power ramping amount as a product of a value obtained by subtracting 1 from the power ramping count value of the first transmission mode and the power ramping step; and the second power ramping amount acquiring unit 62 acquiring the second power ramping amount according to the power ramping count value of the second transmission mode includes: acquiring the second power ramping amount as a product of the power ramping count value of the second transmission mode and the power ramping step.

In an implementation, the power ramping amount is a sum of the first power ramping amount and the second power ramping amount.

In an implementation, the power ramping count value of the first transmission mode is a value of a first counter, and the power ramping count value of the second transmission mode is a value of a second counter.

In an implementation, the power ramping count value is a value of a third counter. The power ramping count value including the power ramping count value of the first transmission mode and the power ramping count value of the second transmission mode includes: the value of the third counter is a sum of the power ramping count value of the first transmission mode and the power ramping count value of the second transmission mode; and When the power ramping is to be performed in the first transmission mode, the value of the third counter is increased by 1, and when the power ramping is to be performed in the second transmission mode, the value of the third counter is increased by 1.

In an implementation, the power ramping amount is a product of a value obtained by subtracting 1 from the power ramping count value and the power ramping step.

In an implementation, the power ramping count value of the first transmission mode is a preamble power ramping count value of the first transmission mode, and the power ramping count value of the second transmission mode is a preamble power ramping count value of the second transmission mode; and the first power ramping step is a preamble power ramping step of the first transmission mode, and the second power ramping step is a preamble power ramping step of the second transmission mode.

In an implementation, the power ramping count value of the first transmission mode is a PUSCH power ramping count value of the first transmission mode, and the power ramping count value of the second transmission mode is a preamble power ramping count value of the second transmission mode; and the first power ramping step is a PUSCH power ramping step of the first transmission mode, and the second power ramping step is a preamble power ramping step of the second transmission mode.

In an implementation, the power ramping count value of the first transmission mode is a preamble power ramping count value of the first transmission mode, and the power ramping count value of the second transmission mode is a PUSCH power ramping count value of the second transmission mode; and the first power ramping step is a preamble power ramping step of the first transmission mode, and the second power ramping step is a PUSCH power ramping step of the second transmission mode.

In an implementation, the power ramping count value of the first transmission mode is a preamble power ramping count value of the first transmission mode, and the power ramping count value of the second transmission mode is a preamble power ramping count value of the second transmission mode; and the power ramping step is a preamble power ramping step or a PUSCH power ramping step.

In an implementation, the power ramping count value of the first transmission mode is a PUSCH power ramping count value of the first transmission mode, and the power ramping count value of the second transmission mode is a preamble power ramping count value of the second transmission mode; and the power ramping step is a preamble power ramping step or a PUSCH power ramping step.

In an implementation, the power ramping count value of the first transmission mode is a preamble power ramping count value of the first transmission mode, and the power ramping count value of the second transmission mode is a PUSCH power ramping count value of the second transmission mode; and the power ramping step is a preamble power ramping step or a PUSCH power ramping step.

In an implementation, the third counter includes: a preamble power ramping counter, or a PUSCH power ramping counter, or an access attempt power ramping counter.

In an implementation, the determining the transmission power according to the power ramping amount includes:

determining a transmission power of a physical random access channel according to the power ramping amount; or, determining the transmission power of the PUSCH according to the power ramping amount.

Figure 7:
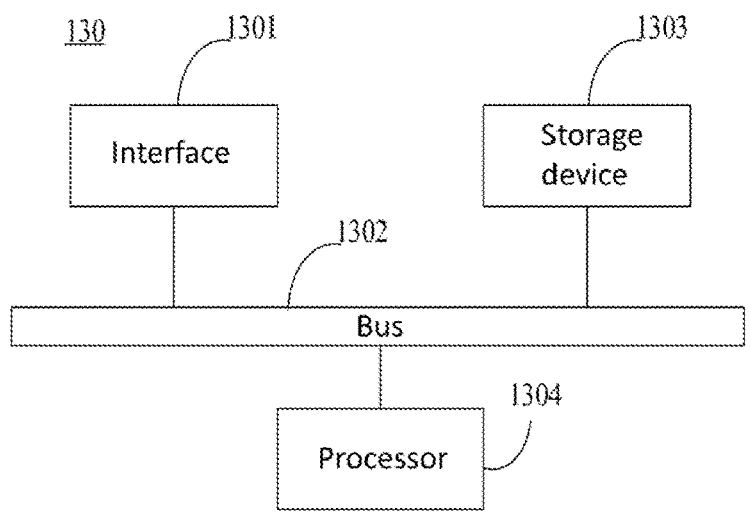
FIG. 7 is a schematic structural diagram of a terminal according to an embodiment of the present application.

FIG. 7 is a schematic structural diagram of a terminal according to an embodiment of the present application. As shown in FIG. 7, the terminal 130 provided in the embodiment of the present application includes: a storage device 1303 and a processor 1304. The terminal 130 may further include an interface 1301 and a bus 1302. The interface 1301, the storage device 1303 and the processor 1304 are connected via the bus 1302. The storage device 1303 is configured to store instructions. The processor 1304 is configured to read the instructions to execute the technical solution of the method, applied to the terminal, in the embodiment as described above, and the implementation principles and technical effects are similar to those described above, which are not repeated here.

The above embodiments are only exemplary embodiments of the present application and not intended to limit the scope of the present application.

The various embodiments of the present application may be implemented in hardware or dedicated circuits, software, logic or any combination thereof. For example, some aspects may be implemented in hardware, while other aspects may be implemented in firmware or software which may be executed by a controller, microprocessor or other computing device, although the present application is not limited thereto.

Embodiments of the present application may be implemented by a data processor of a mobile device executing computer program instructions, for example in a processor entity, or by hardware, or by a combination of software and hardware. The computer program instructions may be assembler instructions, Instruction Set Architecture (ISA) instructions, machine instructions, machine-related instructions, microcode, firmware instructions, state setting data, or source code or object code written in any combination of one or more programming languages.

The block diagrams of any logic flow in the figures of this application may represent program steps, or may represent interconnected logic circuits, modules, and functions, or may represent a combination of program steps and logic circuits, modules, and functions. The computer program may be stored on a storage device. The storage device may be of any type suitable to the local technical environment and may be implemented using any suitable data storage technology. It will be appreciated that the storage device in the embodiment of the present disclosure may be either a volatile storage device or a nonvolatile storage device or may include both. The nonvolatile storage device may be a Read-Only Storage device (ROM), a Programmable ROM (PROM), an Erasable PROM (EPROM), an Electrically EPROM (EEPROM), or a flash storage device. The volatile storage device may be a Random Access Storage device (RAM) used as an external cache. The RAM may include various forms, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). The storage device of the system and the method described herein is intended to include, but not limited to, these and any other suitable types of memories.

The processor in the embodiments of the present application may be of any type suitable to the local technical environment, such as but not limited to general purpose computers, special purpose computers, microprocessors, Digital Signal Processors (DSPs), Application Specific Integrated Circuits (ASICs), Field-Programmable Gate Arrays (FGPAs) or other programmable logic devices, discrete gates or transistor logic devices, discrete hardware components, or processors based on a multi-core processor architecture. The general purpose processor may be a microprocessor or may be any conventional processor or the like. The processor described above may implement or perform the steps of the methods disclosed in the embodiments of the present application. The software module may be located in a storage medium well known in the art, such as an RAM, a flash, an ROM, a PROM or EPROM, a register, or the like. The storage medium is located in a storage device, and a processor reads information in the storage device and combines hardware thereof to complete the steps of the method.

What is claimed is:

1. A power determination method, comprising:
   acquiring a power ramping amount according to a power ramping count value and a power ramping step, wherein the power ramping count value comprises a power ramping count value of a first transmission mode and a power ramping count value of a second transmission mode; and
   determining a transmission power according to the power ramping amount,
   wherein the acquiring the power ramping amount according to the power ramping count value and the power ramping step comprises:
   acquiring a first power ramping amount according to the power ramping count value of the first transmission mode and the power ramping step;
   acquiring a second power ramping amount according to the power ramping count value of the second transmission mode and the power ramping step; and
   acquiring the power ramping amount according to the first power ramping amount and the second power ramping amount;
   wherein the acquiring the first power ramping amount according to the power ramping count value of the first transmission mode and the power ramping step comprises:
   acquiring the first power ramping amount as a product of a value obtained by subtracting 1 from the power ramping count value of the first transmission mode and the power ramping step; and
   the acquiring the second power ramping amount according to the power ramping count value of the second transmission mode and the power ramping step comprises:
   acquiring the second power ramping amount as a product of the power ramping count value of the second transmission mode and the power ramping step.

2. The method according to claim 1, wherein the power ramping step comprises a first power ramping step and a second power ramping step, wherein the first power ramping step is a power ramping step of the first transmission mode, and the second power ramping step is a power ramping step of the second transmission mode;
   the acquiring the first power ramping amount according to the power ramping count value of the first transmission mode and the power ramping step comprises:
   acquiring the first power ramping amount as a product of a value obtained by subtracting 1 from the power ramping count value of the first transmission mode and the first power ramping step; and
   the acquiring the second power ramping amount according to the power ramping count value of the second transmission mode and the power ramping step comprises:
   acquiring the second power ramping amount as a product of the power ramping count value of the second transmission mode and the second power ramping step.

3. The method according to claim 2, wherein the power ramping count value of the first transmission mode is a preamble power ramping count value of the first transmission mode, and the power ramping count value of the second transmission mode is a preamble power ramping count value of the second transmission mode; and
   the first power ramping step is a preamble power ramping step of the first transmission mode, and the second power ramping step is a preamble power ramping step of the second transmission mode.

4. The method according to claim 2, wherein the power ramping count value of the first transmission mode is a PUSCH power ramping count value of the first transmission mode, and the power ramping count value of the second transmission mode is a preamble power ramping count value of the second transmission mode; and
   the first power ramping step is a PUSCH power ramping step of the first transmission mode, and the second power ramping step is a preamble power ramping step of the second transmission mode.

5. The method according to claim 2, wherein the power ramping count value of the first transmission mode is a preamble power ramping count value of the first transmission mode, and the power ramping count value of the second transmission mode is a PUSCH power ramping count value of the second transmission mode; and
   the first power ramping step is a preamble power ramping step of the first transmission mode, and the second power ramping step is a PUSCH power ramping step of the second transmission mode.

6. The method according to claim 1, wherein the acquiring the power ramping amount according to the first power ramping amount and the second power ramping amount comprises:
   acquiring the power ramping amount as a sum of the first power ramping amount and the second power ramping amount.

7. The method according to claim 1, wherein the power ramping count value of the first transmission mode is a value of a first counter, and the power ramping count value of the second transmission mode is a value of a second counter.

8. The method according to claim 1, wherein the power ramping count value is a value of a third counter;
   the power ramping count value comprising the power ramping count value of the first transmission mode and the power ramping count value of the second transmission mode comprises:
   the value of the third counter is a sum of the power ramping count value of the first transmission mode and the power ramping count value of the second transmission mode; and
   the value of the third counter is incremented by 1 in response to that the power ramping is to be performed in the first transmission mode, and the value of the third counter is incremented by 1 in response to that the power ramping is to be performed in the second transmission mode.

9. The method according to claim 8, wherein the power ramping count value of the first transmission mode is a preamble power ramping count value of the first transmission mode, and the power ramping count value of the second transmission mode is a preamble power ramping count value of the second transmission mode; and the power ramping step is a preamble power ramping step or a PUSCH power ramping step.

10. The method according to claim 8, wherein the power ramping count value of the first transmission mode is a PUSCH power ramping count value of the first transmission mode, and the power ramping count value of the second transmission mode is a preamble power ramping count value of the second transmission mode; and the power ramping step is a preamble power ramping step or a PUSCH power ramping step.

11. The method according to claim 8, wherein the power ramping count value of the first transmission mode is a preamble power ramping count value of the first transmission mode, and the power ramping count value of the second transmission mode is a PUSCH power ramping count value of the second transmission mode; and the power ramping step is a preamble power ramping step or a PUSCH power ramping step.

12. The method according to claim 1, wherein the power ramping count value of the first transmission mode is a preamble power ramping count value of the first transmission mode, and the power ramping count value of the second transmission mode is a preamble power ramping count value of the second transmission mode; and the power ramping step is a preamble power ramping step or a PUSCH power ramping step.

13. The method according to claim 1, wherein the power ramping count value of the first transmission mode is a PUSCH power ramping count value of the first transmission mode, and the power ramping count value of the second transmission mode is a preamble power ramping count value of the second transmission mode; and the power ramping step is a preamble power ramping step or a PUSCH power ramping step.

14. The method according to claim 1, wherein the power ramping count value of the first transmission mode is a preamble power ramping count value of the first transmission mode, and the power ramping count value of the second transmission mode is a PUSCH power ramping count value of the second transmission mode; and the power ramping step is a preamble power ramping step or a PUSCH power ramping step.

15. The method according to claim 1, wherein the determining the transmission power according to the power ramping amount comprises:

determining a transmission power of a physical random access channel according to the power ramping amount; or, determining a transmission power of a PUSCH according to the power ramping amount.

16. A terminal, comprising: a processor and a storage device; wherein the storage device is configured to store instructions; and the processor is configured to read the instructions to implement the power determination method according to claim 1.

17. A storage medium storing a computer program thereon, wherein the computer program, when executed by a processor, causes the power determination method according to claim 1 to be implemented.

* * * * *

UNITED STATES PATENT AND TRADEMARK OFFICE
CERTIFICATE OF CORRECTION

PATENT NO. : 11,974,233 B2
APPLICATION NO. : 17/607700
DATED : April 30, 2024
INVENTOR(S) : Weimin Li et al.

It is certified that error appears in the above-identified patent and that said Letters Patent is hereby corrected as shown below:

In the Specification

Column 10, Line 40, the parameter reading - a' - should read -- $a^{th}$ --

Signed and Sealed this
Thirteenth Day of August, 2024

Katherine Kelly Vidal
*Director of the United States Patent and Trademark Office*